(12) United States Patent
Lin et al.

(10) Patent No.: US 6,816,212 B2
(45) Date of Patent: Nov. 9, 2004

(54) ASSEMBLING STRUCTURE OF A METAL FRAME AND AN ELECTRIC MODULE FOR USE IN A LIQUID CRYSTAL DISPLAY

(75) Inventors: Chien-Yu Lin, Pan-Chiao (TW); Chieh-Kuen Wang, Yung-Kang (TW); Hsin-Fa Hsu, Kuan-Miao Country (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 67 days.

(21) Appl. No.: 10/217,598

(22) Filed: Aug. 13, 2002

(65) Prior Publication Data

US 2003/0137487 A1 Jul. 24, 2003

(30) Foreign Application Priority Data

Jan. 4, 2002 (CN) ........................................ 91100070 A

(51) Int. Cl.[7] .............................................. G06F 1/1333
(52) U.S. Cl. .......................................... 349/58; 349/149
(58) Field of Search .......................... 349/58, 149, 150, 349/151, 152, 65, 62, 64

(56) References Cited

U.S. PATENT DOCUMENTS

| | | | | |
|---|---|---|---|---|
| 5,432,626 A | * | 7/1995 | Sasuga et al. | ................ 349/58 |
| 5,640,216 A | * | 6/1997 | Hasegawa et al. | ............ 349/58 |
| 5,684,550 A | * | 11/1997 | Shibata et al. | ................ 349/62 |
| 5,946,062 A | * | 8/1999 | Hasegawa et al. | ............ 349/58 |
| 6,222,597 B1 | * | 4/2001 | Muramatsu | ................... 349/58 |

FOREIGN PATENT DOCUMENTS

TW            289456        8/2002

* cited by examiner

*Primary Examiner*—Daniel Stcyr
*Assistant Examiner*—Daniel A. Hess
(74) *Attorney, Agent, or Firm*—Senniger Powers

(57) ABSTRACT

The present invention relates to an assembling structure of a metal frame and an electric module for use in a liquid crystal display. The metal frame comprises an inside portion and a straight portion. The inside portion has a plurality of holes formed on a side of the metal frame. The electric module comprises a circuit board and at least one straight strip. The straight strip is mounted on a side of the circuit board. The straight strip has a plurality of hooks formed in positions corresponding to the holes. The hooks are adapted to be accommodated in the holes so as to assemble the electric module on the metal frame. Therefore, according to the invention, the electric module can be assembled easily on the metal frame. The grounding of the electric module electrically connects to the metal frame. The grounding characteristic of the electric module is good, and the circuits of the electric module work stably. Furthermore, it is easy to separate the electric module from the metal frame without breaking the electric module and the metal frame. After the electric module is separated from the metal frame, the electric module and the metal frame can be reused. Therefore, the total cost is decreased.

2 Claims, 5 Drawing Sheets

ASSEMBLING STRUCTURE OF A METAL FRAME AND AN ELECTRIC MODULE FOR USE IN A LIQUID CRYSTAL DISPLAY

BACKGROUND OF THE INVENTION

1. Field of the Invention

The present invention relates to an assembling structure of a metal frame and an electric module, more particularly, to an assembling structure of a metal frame and an electric module for use in a liquid crystal display.

2. Description of the Related Art

Referring to FIG. 1, a metal frame 1 is used for fixing the liquid crystal display module (not shown in the figure). The metal frame 1 comprises an inside portion 11 and a straight portion 12. The inside portion 11 is perpendicular to the straight portion 12. An electric module 2 (for example, inverter module) is attached onto the metal frame 1.

The electric module 2 comprises a circuit board 21 and a connecting board 22. There are many ICs on the circuit board 21. According to the conventional technique, the connecting board 22 has a layer of gum 23 on a bottom of the connecting board 22. The connecting board 22 can be attached onto the inside portion 11 of the metal frame 1 by the layer of gum 23. Therefore, the electric module 2 can be attached onto the metal frame 1.

The grounding of the electric module 2 usually connects to the metal frame 1. However, the conventional technique utilizes the layer of gum 23 to attach the electric module 2 on the metal frame 1. The electric module 2 cannot electrically connect to the metal frame for the grounding. The grounding characteristic of the electric module 2 is bad and cause the whole electrical performance of the electric module 2 to be unsatisfactory. Also, the circuits of the electric module might not work stably.

Furthermore, because the electric module 2 is attached firmly onto the metal frame 1, it is difficult to separate the electric module 2 from the metal frame 1. It is possible to break the electric module 2 and the metal frame 1.

Therefore, it is necessary to provide an innovative and progressive assembling structure for a metal frame and an electric module so as to solve the above problem.

SUMMARY OF THE INVENTION

One objective of the present invention is to provide an assembling structure of a metal frame and an electric module for use in a liquid crystal display. The metal frame comprises an inside portion and a straight portion. The inside portion is perpendicular to the straight portion. The inside portion has a plurality of holes formed on a side of the metal frame. The electric module comprises a circuit board and at least one straight strip. The straight strip is mounted on a side of the circuit board. The straight strip has a plurality of hooks formed in positions corresponding to the holes. The hooks are adapted to couple to the holes so as to assemble the electric module on the metal frame.

Therefore, according to the invention, the electric module can be assembled easily on the metal frame. The grounding of the electric module electrically connects to the metal frame. The grounding characteristics of the electric module is good, and the circuits of the electric module work stably.

Furthermore, because the hooks of the electric module are coupled to the holes of the metal frame to form the assembling structure, it is easy to separate the electric module from the metal frame without breaking the electric module and the metal frame. After the electric module is separated from the metal frame, the electric module and the metal frame can be reused. Therefore, the total cost is decreased.

DETAILED DESCRIPTION OF THE INVENTION

Figure 1:
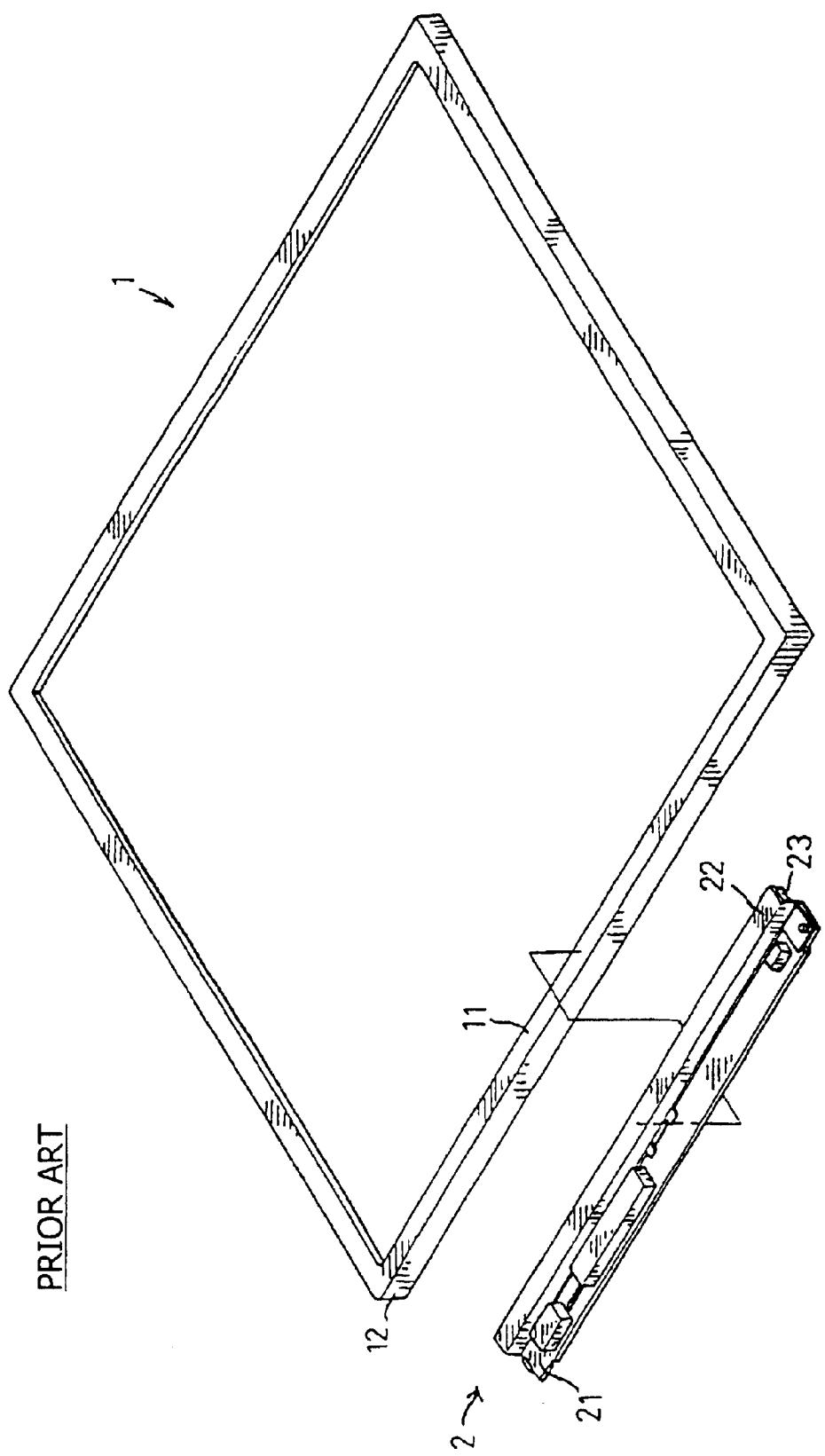
FIG. 1 is a perspective view showing the conventional electric module and the metal frame.
Figure 2:
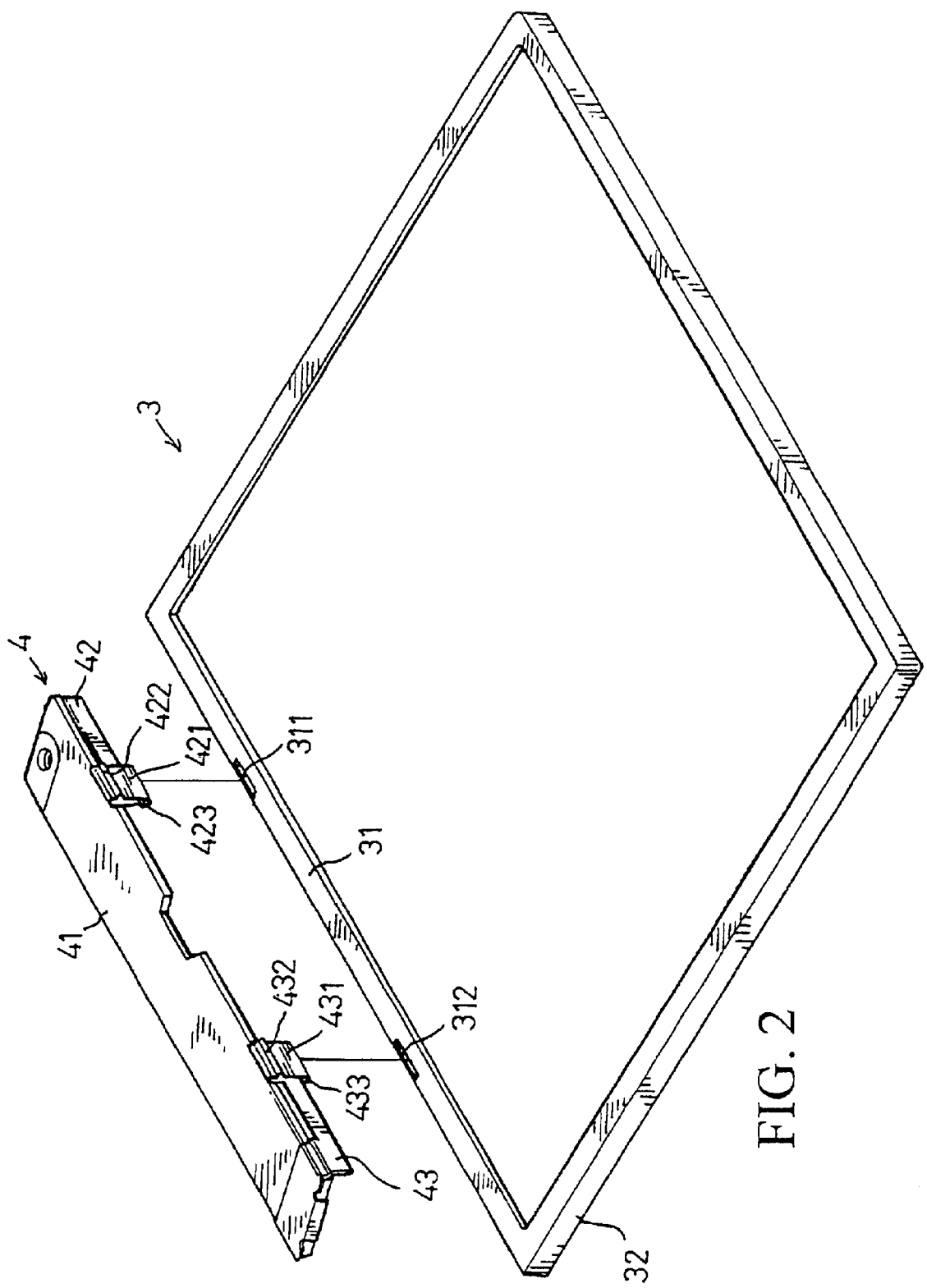
FIG. 2 is a perspective view showing an electric module and a metal frame, according to the first embodiment of the invention.

Referring to FIG. 2, according to the first embodiment of the invention, a metal frame 3 comprises an inside portion 31 and a straight portion 32. The inside portion 31 is substantially perpendicular to the straight portion 32. The inside portion 31 has two holes 311, 312 formed through the inside portion 31. The holes 311, 312 are formed on a side of the metal frame 3, and are located at an adjacent area between the inside portion 31 and the straight portion 32.

An electric module 4 comprises a circuit board 41 and two straight strips 42, 43. The straight strips 42, 43 are mounted on a side of the circuit board 41, and respectively extend from two ends to a middle section of the circuit board 41. The straight strip 42 has a hook 421, and the straight strip 43 has a hook 431. Each of the hooks 421, 431 extends from a top section of the straight strips 42, 43 respectively and inversely bends downward to form a sheet configuration. The hooks 421, 431 are arranged on the positions corresponding to the holes 311, 312 of the metal frame 3. The hooks 421, 431 are adapted to couple to the holes 311, 312 so as to assemble the electric module 4 on the metal frame 3.

Figure 3:
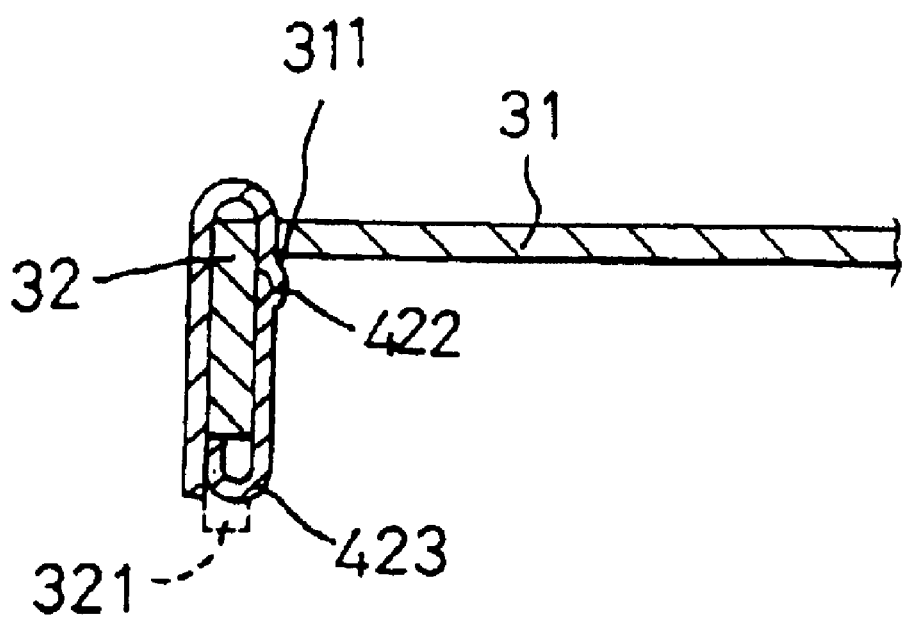
FIG. 3 is a cross-section view showing an assembling structure of the electric module and the metal frame, according to the first embodiment of the invention.

The hooks 421, 431 have transverse protrusions 422, 432, respectively. The transverse protrusions 422, 423 are formed on an upper area of the hooks 421, 431. Referring to FIG. 3, the hook 421 and the hole 311 are taken as an example. After the hook 421 is coupled to the corresponding hole 311, the transverse protrusion 422 is positioned under the inside portion 31 to prevent the hook 421 from disengaging out of the hole 311 and to hold a uniform level. Therefore, the above structure can ensure the firm connection between the metal frame 3 and the electric module 4.

Figure 4:
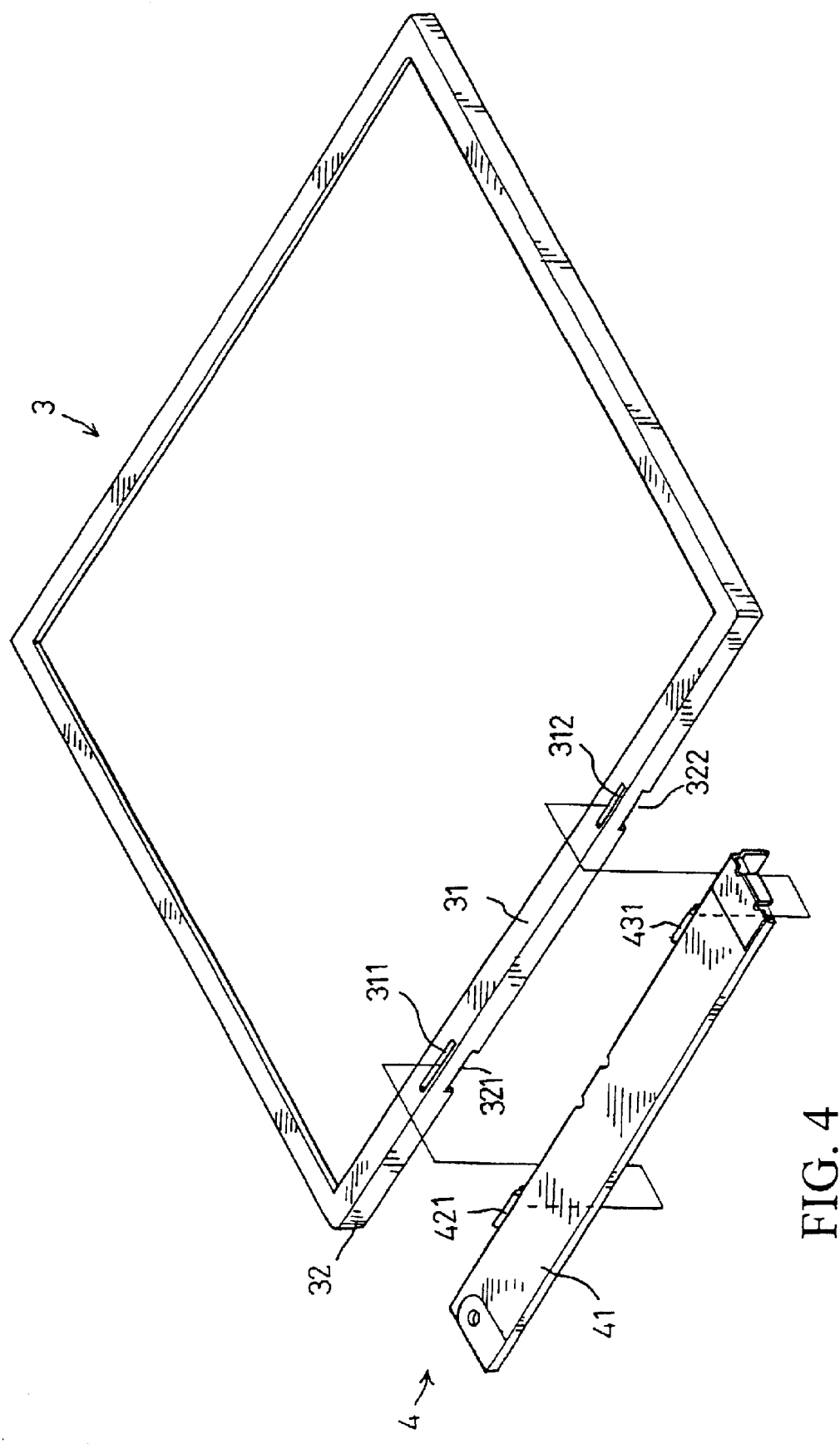
FIG. 4 is another perspective view showing the electric module and the metal frame, according to the first embodiment of the invention.

Referring to FIG. 2 again, the hooks 421, 431 respectively have an inversely folding portion 423, 433. The folding portions 423, 433 are formed on a bottom area of the hooks 421, 431. Referring to FIG. 4, the straight portion 32 of the metal frame 3 has two grooves 321, 322 formed in positions corresponding to the folding portions 423, 433. The folding portions 423, 433 are adapted to couple to the grooves 321, 322, respectively. Referring to FIG. 3, after the hook 421 is coupled to the corresponding hole 311, the folding portion 423 is accommodated in the groove 321 (shown in dotted lines). The transverse protrusion 422 and the folding portion 423 are utilized to position under the inside portion 31 and in the groove 321 of the straight portion 32 so that the assembling connection between the metal frame 3 and the electric module 4 is fixed firmly.

The straight strips 42, 43 of the electric module 4 are made of metal material, and are connecting to the grounding of the circuit board 41. After the electric module 4 is assembled onto the metal frame 3, the circuit board 41 is electrically connected to the metal frame 3 by the straight strips 42, 43. Therefore, the circuit board 41 of the electric module 4 has good grounding characteristics. The electrical performance of the circuit board 41 is therefore stable.

When one wishes to separate the electric module 4 and the metal frame 3, the folding portions 423, 433 should be push away from the grooves 321, 322, firstly. Then, the electric module 4 is moved up to separate the hooks 421, 431 from the holes 311, 312. According to the invention, it is easy to assemble and separate the electric module 4 from the metal frame 3. Therefore, the electric module 4 can be changed repeatedly as desired, and the electric module 4 and the metal frame 3 would not be broken.

Figure 5:
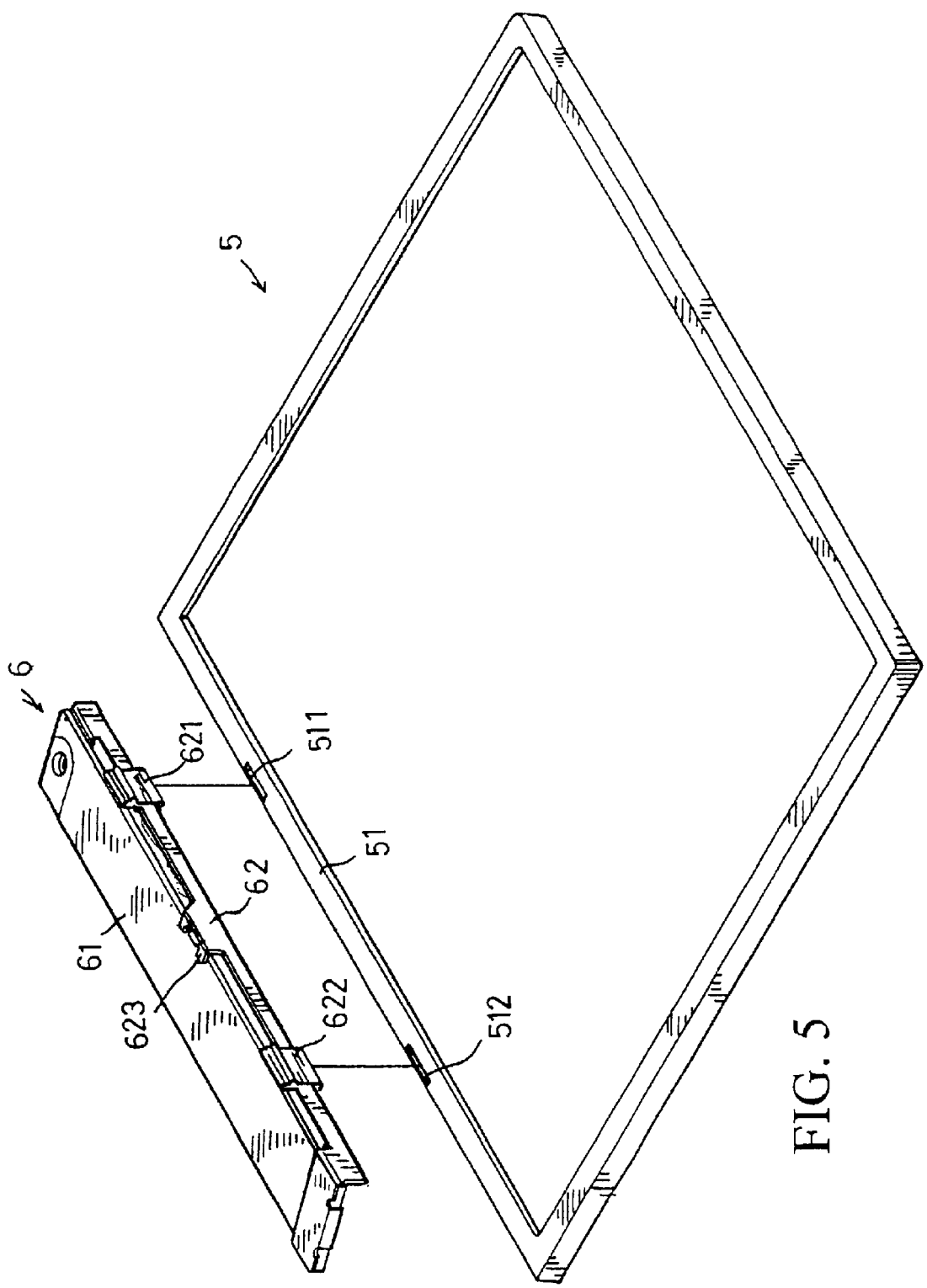
FIG. 5 is a perspective view showing an electric module and a metal frame, according to the second embodiment of the invention.

Referring to FIG. 5, it shows a metal frame 5 and an electric module 6 according to the second embodiment of the invention. The structure of the metal frame 5 is the same as that of the metal frame 3 of the first embodiment of the invention. The electric module 6 comprises a circuit board 61 and a straight strip 62. The straight strip 62 is mounted on a side of the circuit board 61. There is a support plate 623 formed on a middle section of the straight strip 62 and on the circuit board 61. The support plate 623 can improve the structural strength of the straight strip 62. When the circuit board 61 has more ICs and is heavier, the support plate 623 can be utilized to improve the structural strength.

The straight strip 62 has two hooks 621, 622 extending from a top section to a bottom section of the straight strip 62. Two hooks 621, 622 are adapted to accommodate in holes 511, 512 of the metal frame 5 so as to assemble the electric module 6 onto the metal frame 5.

While an embodiment of the present invention has been illustrated and described, various modifications and improvements can be made by those skilled in the art. The embodiment of the present invention is therefore described in an illustrative but not restrictive sense. It is intended that the present invention may not be limited to the particular forms as illustrated, and that all modifications which maintain the spirit and scope of the present invention are within the scope as defined in the appended claims.

What is claimed is:

1. An assembling structure of a metal frame and an electric module for use in a liquid crystal display, the metal frame comprising:
    an inside portion, having a plurality of holes formed on a side of the metal frame; and
    a straight portion being substantially perpendicular to the inside portion, the straight portion having a plurality of grooves;
the electric module comprising:
    a circuit board; and
    at least one straight strip, mounted on a side of the circuit board, the at least one straight strip having a plurality of hooks in positions corresponding to the holes, the hooks adapted to couple to the holes so as to assemble the electric module onto the metal frame, each of the hooks extending from a top section of the at least one straight strip and inversely bending downward to form a sheet configuration, each of the hooks having a inversely folding portion formed on a bottom area thereof and in positions corresponding to the grooves, thereby the folding portions are adapted to couple the grooves.

2. An assembling structure of a metal frame and an electric module for use in a liquid crystal display, the metal frame comprising:
    an inside portion having two holes formed on a side of the metal frame; and
    a straight portion being substantially perpendicular to the inside portion, the straight portion having two grooves;
the electric module comprising:
    a circuit board; and
    two straight strips, respectively extending from two ends of the side of the circuit board, the two straight strips having two hooks in positions corresponding to the two holes, the two hooks respectively adapted to couple to the two holes so as to assemble the electric module onto the metal frame, each of the two hooks extending from a top section of each of the straight strips and inversely bending downward to form a sheet configuration, each of the two hooks having a inversely folding portion formed on a bottom area thereof and in positions corresponding to the two grooves, thereby the two folding portions are adapted to couple to the two grooves, respectively.

* * * * *